United States Patent
Zhang et al.

(10) Patent No.: US 10,768,392 B2
(45) Date of Patent: Sep. 8, 2020

(54) LENS MODULE AND METHOD OF ASSEMBLING LENS MODULE

(71) Applicant: TRIPLE WIN TECHNOLOGY(SHENZHEN) CO. LTD., Shenzhen (CN)

(72) Inventors: Long-Fei Zhang, Guangdong (CN); Shin-Wen Chen, New Taipei (TW); Kun Li, Shenzhen (CN); Xiao-Mei Ma, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 21 days.

(21) Appl. No.: 16/185,052

(22) Filed: Nov. 9, 2018

(65) Prior Publication Data
US 2020/0057228 A1     Feb. 20, 2020

(30) Foreign Application Priority Data
Aug. 16, 2018 (CN) .......................... 2018 1 0935797

(51) Int. Cl.
G02B 7/02 (2006.01)
H04N 5/225 (2006.01)

(52) U.S. Cl.
CPC ............. *G02B 7/02* (2013.01); *H04N 5/2253* (2013.01); *H04N 5/2254* (2013.01); *H04N 5/22521* (2018.08)

(58) Field of Classification Search
CPC .... G02B 7/02; H04N 5/2253; H04N 5/22521; H04N 5/2254; H04N 5/2251
See application file for complete search history.

(56) References Cited

U.S. PATENT DOCUMENTS

| | | | | |
|---|---|---|---|---|
| 2002/0140837 | A1* | 10/2002 | Miyake | H04N 5/2253 348/340 |
| 2011/0102667 | A1* | 5/2011 | Chua | H04N 5/2251 348/374 |
| 2011/0194023 | A1* | 8/2011 | Tam | H04N 5/2253 348/374 |

* cited by examiner

*Primary Examiner* — Ahmed A Berhan
(74) *Attorney, Agent, or Firm* — ScienBiziP, P.C.

(57) ABSTRACT

A lens module includes a photosensitive chip, a hollow mounting frame, a filter, a lens holder, a lens, and a circuit board defining a first through hole and comprising a first surface and an opposite second surface. The photosensitive chip is installed on the first surface facing. The first surface includes electronic components and gold fingers installed thereon. One side of the photosensitive chip includes an electrical coupling portion electrically coupled to the gold fingers. The circuit board further includes an injection molding layer integrally formed onto the first surface. The injection molding layer seals the electronic components and the photosensitive chip therein. The mounting frame is fixed onto the second surface of the circuit board. The lens is installed within the lens holder. The lens holder is fixed onto a surface of the mounting frame facing away from the circuit board.

17 Claims, 6 Drawing Sheets

LENS MODULE AND METHOD OF ASSEMBLING LENS MODULE

FIELD

The subject matter herein generally relates to lens modules, and more particularly to a method of assembling a lens module and a structure thereof.

BACKGROUND

Generally, lens modules in electronic devices are small in size, and market demand is trending toward miniaturization of the lens modules.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
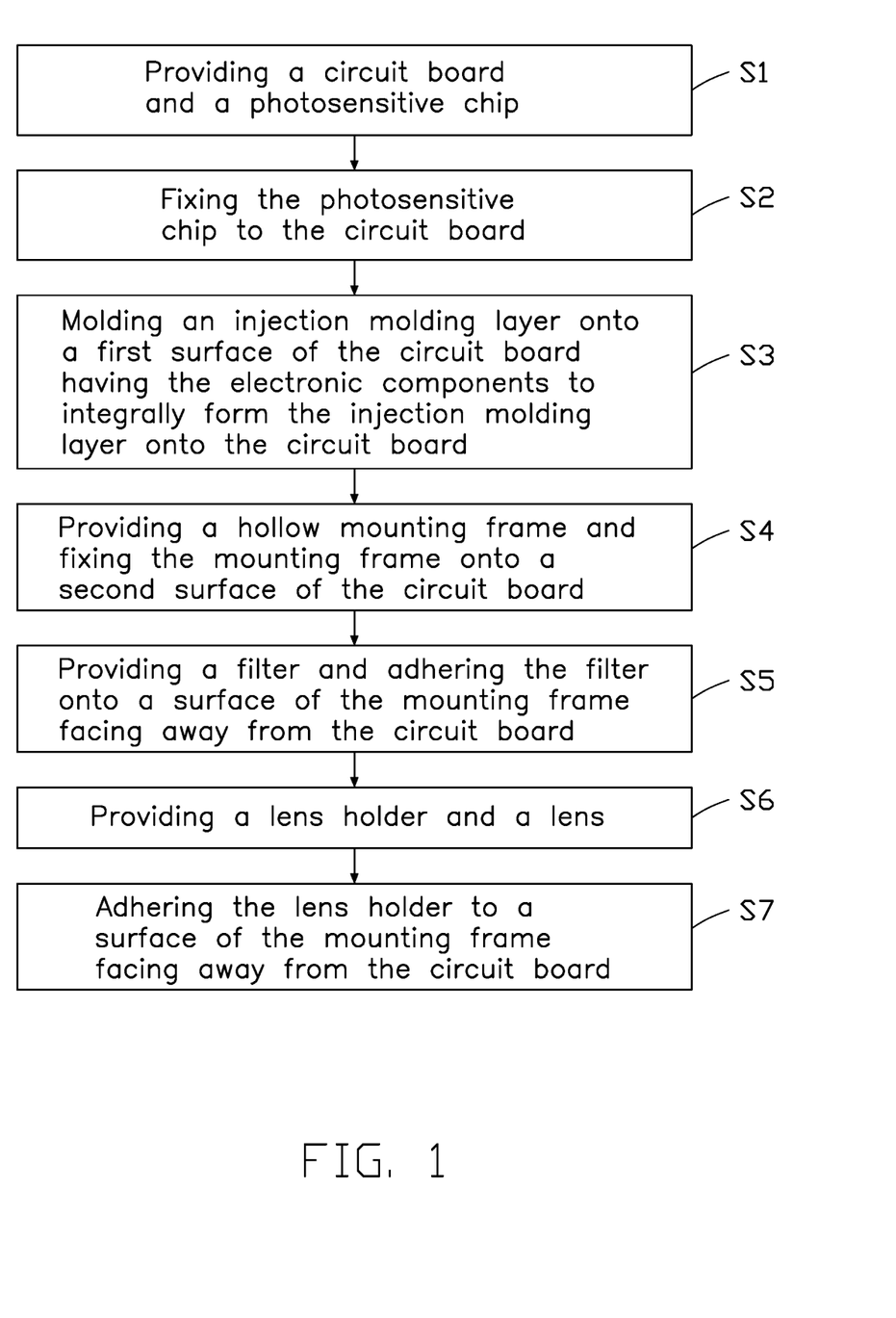
FIG. 1 is a flowchart of a method of an embodiment for assembling a lens module.

FIG. 1 illustrates a flowchart of an exemplary method for assembling a lens module. The example method is provided by way of example, as there are a variety of ways to carry out the method. The method described below can be carried out using the configurations illustrated in FIGS. 2-5, for example, and various elements of these figures are referenced in explaining the example method. Each block shown in FIG. 1 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S1.

Figure 3:
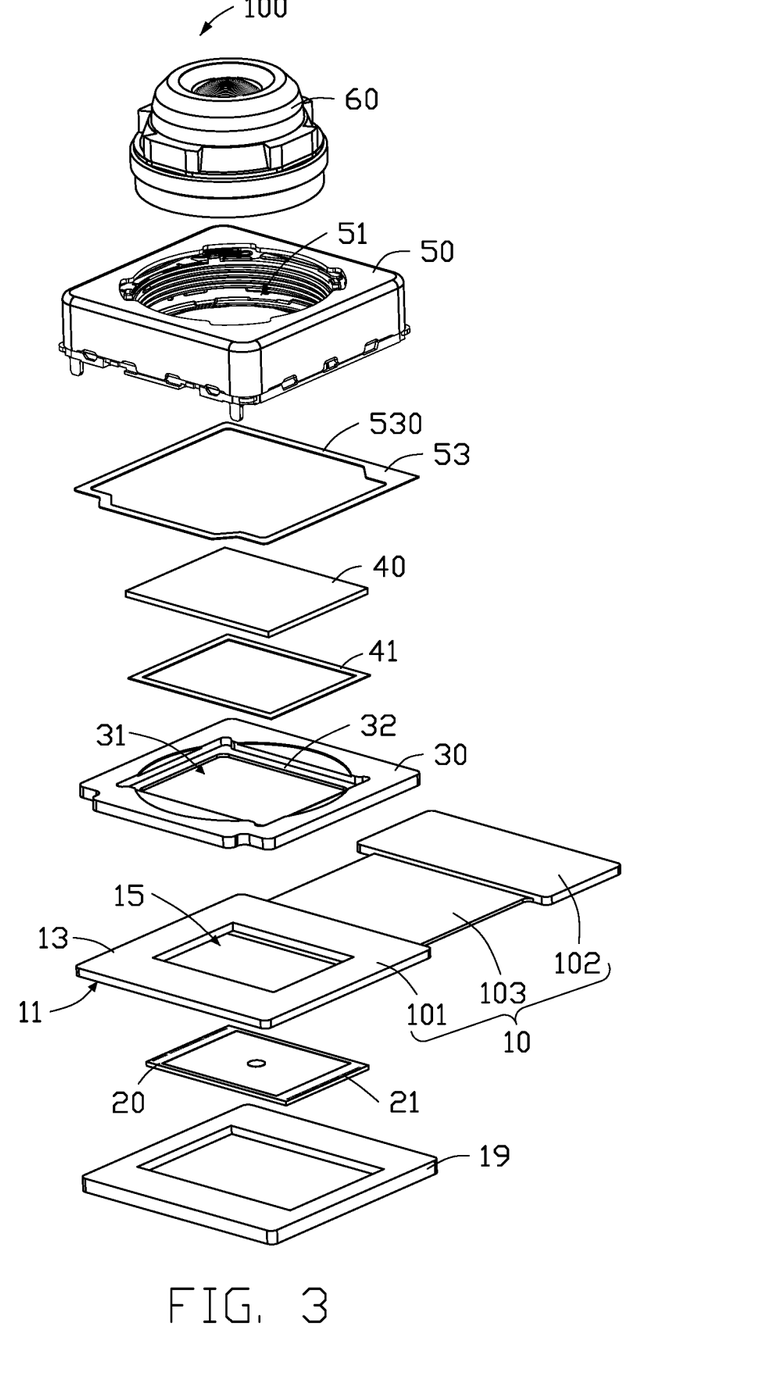
FIG. 3 is an exploded view of the lens module in FIG. 2.
Figure 4:
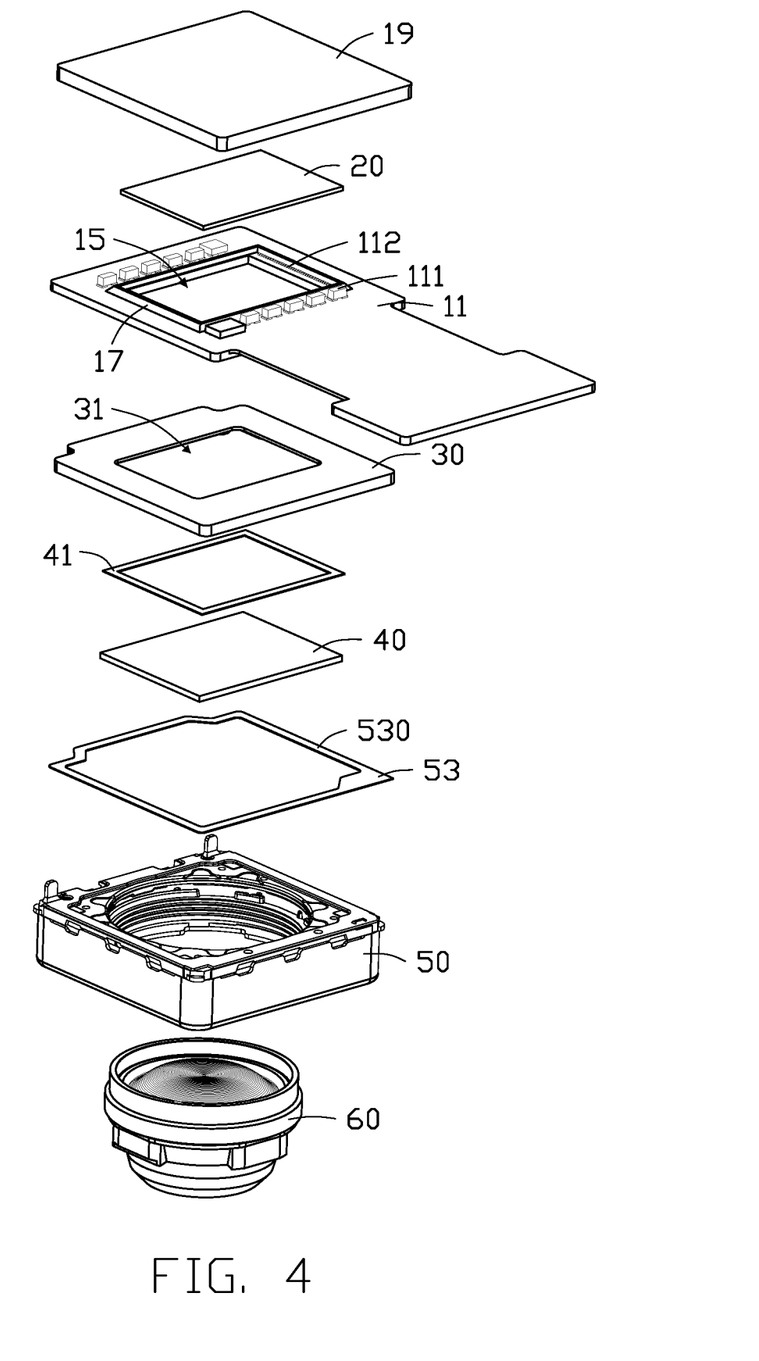
FIG. 4 is similar to FIG. 3 showing the lens module from another angle.
Figure 5:
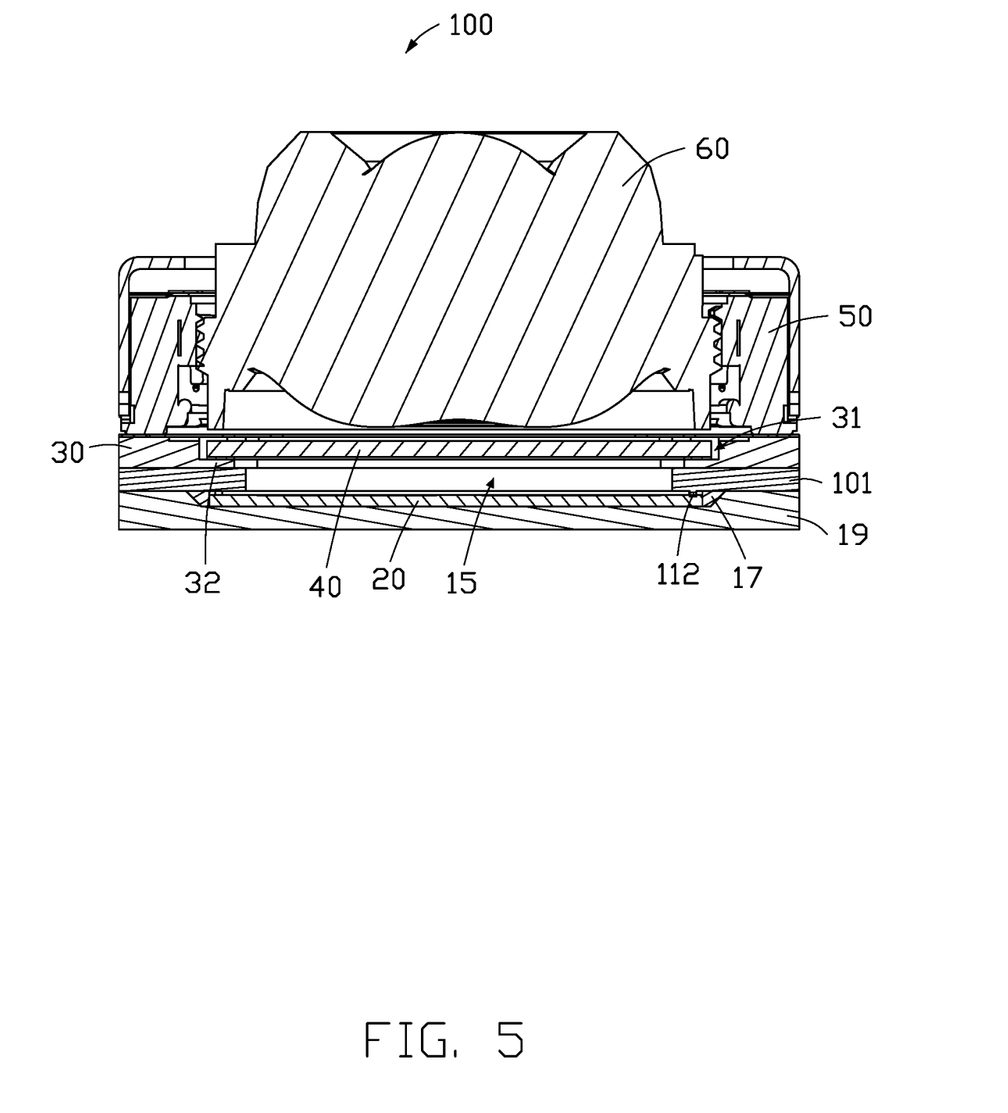
FIG. 5 is a cross-sectional view of the lens module in FIG. 2 taken along line V-V.

At block S1: a circuit board 10 and a photosensitive chip 20 are provided. As shown in FIG. 3 and FIG. 4, the circuit board 10 includes a first surface 11 and an opposite second surface 13. The circuit board 10 defines a first through hole 15, and the photosensitive chip 20 is installed onto the first surface 11 of the circuit board 10 and is aligned with the first through hole 15. The first surface 11 has electronic components 111 and gold fingers 112 installed thereon.

In at least one embodiment, the circuit board 10 is a ceramic board, a flexible board, a hard board, or a flexible-hard board. In at least one embodiment, the circuit board 10 is a combination of a flexible-hard composite board including a first hard portion 101, a second hard portion 102, and a soft portion 103. The soft portion 103 is located between the first hard portion 101 and the second hard portion 102. The photosensitive chip 20 is fixed onto the first hard portion 101. In detail, referring to FIG. 4, the electronic components 111 and the gold fingers 112 are fixed onto the first hard portion 101 on the first surface 11. The electronic components 111 and the gold fingers 112 are located around a periphery of the photosensitive chip 20. The electronic components 111 may be resistors, capacitors, diodes, triodes, relays, an electrically-erasable programmable read-only memory, or other passive electronic components. The gold fingers 112 are located around a periphery of the photosensitive chip 20.

Figure 2:
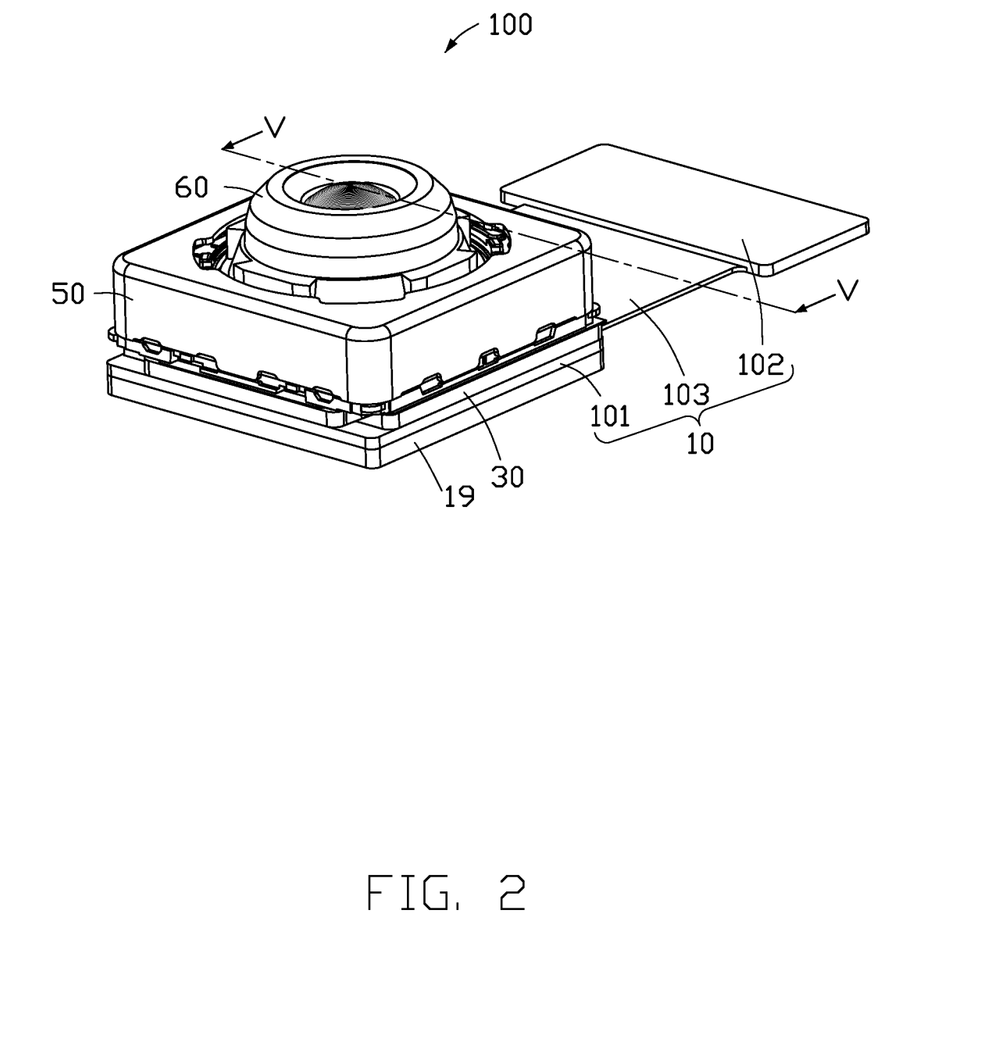
FIG. 2 is an isometric view of an embodiment of a lens module.

Referring to FIG. 2, after the photosensitive chip 20 is installed, an electrical coupling portion 21 is arranged around a periphery of the photosensitive chip 20 to electrically couple the electrical coupling portion 21 to the gold fingers 112 (see FIG. 4). The electronic components 21 are plain conductors or metal balls. The electrical coupling portion 21 may be made of highly conductive metal material, such as gold. In at least one embodiment, the photosensitive chip 20 is a complimentary metal oxide semiconductor (CMOS) chip or a charge-coupled device (CCD) chip.

At block S2, as shown in FIG. 4, a hollow first adhesive layer 17 is arranged around a periphery of the photosensitive chip 20 to fix the photosensitive chip 20 to the circuit board 10. A material of the first adhesive layer 17 may be optical cement or a sealant. The first adhesive layer 17 seals the gold fingers 112 and the electrical coupling portions 21.

At block S3, an injection molding layer 19 is molded onto the first surface 11 of the circuit board 10 having the electronic components 111 to integrally form the injection molding layer 19 onto the circuit board 10. The injection molding layer 19 seals the electronic components 111 and the photosensitive chip 20 within the injection molding layer 19. A material of the injection molding layer 19 is selected from nylon, liquid crystal polymer, and polypropylene. A molding method may be injection molding, mold pressing, or the like. The injection molding layer 19 is substantially rectangular.

At block S4, a hollow mounting frame 30 is provided. The mounting frame 30 is fixed onto a second surface 13 of the circuit board 10. The mounting frame 30 is substantially rectangular and defines a second through hole 31. In at least one embodiment, the mounting frame 30 is molded onto the second surface 13 of the circuit board 10.

At block S5, a filter 40 is provided. The filter 40 is adhered by a second adhesive layer 41 to a surface of the mounting frame 30 facing away from the circuit board 10. The filter 40 is arranged on a side of the circuit board 10 opposite to the photosensitive film 20.

In at least one embodiment, an inner wall of the second through hole 31 includes a flange 32 protruding toward a center of the second through hole 31. The filter 40 is fixed onto a surface of the flange 32 facing away from the photosensitive chip 20. A surface of the filter 40 facing away from the circuit board 10 is substantially coplanar with a surface of the mounting frame 30 facing away from the circuit board 10. A material of the second adhesive layer 41 may be optical cement.

In at least one embodiment, the filter 40 is an infrared filter formed by an optical substrate (not shown) coated in turns with an optical film having a high refractive index. The optical film allows light within the visible region (400-630 nm) and blocks near-infrared (700-1100 nm) light.

At block S6, a lens holder 50 and a lens 60 are provided. The lens 60 is installed within the lens holder 50.

In at least one embodiment, a material of the lens 60 is resin, and the lens holder 50 is a voice coil motor. The lens holder 50 defines a third through hole 51. The lens 60 is installed within the third through hole 51 of the lens holder 50.

At block S7, a hollow third adhesive layer 53 is applied around a periphery of the lens holder 50 to adhere the lens holder 50 to a surface of the mounting frame 30 facing away from the circuit board 10. The lens 60 is arranged on a side of the circuit board 10 opposite to the photosensitive chip 20, and the lens module 100 is formed.

The lens holder 50 is substantially rectangular, and a shape and a size of the lens holder 50 correspond to a shape and a size of the mounting frame 30. The third adhesive layer 53 is substantially a hollow rectangle and includes four sides 530 connecting end-to-end. A material of the third adhesive layer 53 may be optical cement.

FIGS. 2-5 illustrate a first embodiment of the lens module 100 for use in an electronic device (not shown). The electronic device may be a mobile phone, a tablet computer, or the like. The camera module 100 includes a circuit board 10, a photosensitive chip 20, a hollow mounting frame 30, a filter 40, a hollow lens holder 50, and a lens 60.

The circuit board 10 includes a first surface 11 and an opposite second surface 13. The circuit board 10 defines a first through hole 15 through the first surface 11 and the second surface 13. The photosensitive chip 20 is installed onto the first surface 11 of the circuit board 10 and is aligned with the first through hole 15. The photosensitive chip 20 is adhered to the first surface 11. The circuit board 10 is a hard-flexible composite board including a first hard portion 101, a second hard portion 102, and a soft portion 103. The soft portion 103 is located between the first hard portion 101 and the second hard portion 102. The photosensitive chip 20 is fixed onto the first hard portion 101. The first hard portion 101 has electronic components 111 and gold fingers 112 installed thereon on the first surface 11. An electrical coupling portion 21 is arranged around a periphery of one surface of the photosensitive chip 20 to electrically couple the electrical coupling portion 21 to the gold fingers 112. An injection molding layer 19 is molded onto the first surface 11 of the circuit board 10 having the electronic components 111 to integrally form the injection molding layer 19 onto the circuit board 10. The injection molding layer 19 seals the photosensitive chip 20 with the electronic components 111 and the gold fingers 112 within the injection molding layer 19.

The mounting frame 30 is fixed onto the second surface 13 of the circuit board 10. The filter 40 is adhered to the mounting frame 30, and the filter 40 is arranged on a side of the circuit board 10 opposite to the photosensitive chip 20.

The lens holder 50 is adhered to a surface of the mounting frame 30 facing away from the circuit board 10. The lens 60 is installed within the lens holder 50. The lens 60 is arranged on a side of the circuit board 10 opposite to the photosensitive chip 20.

Figure 6:
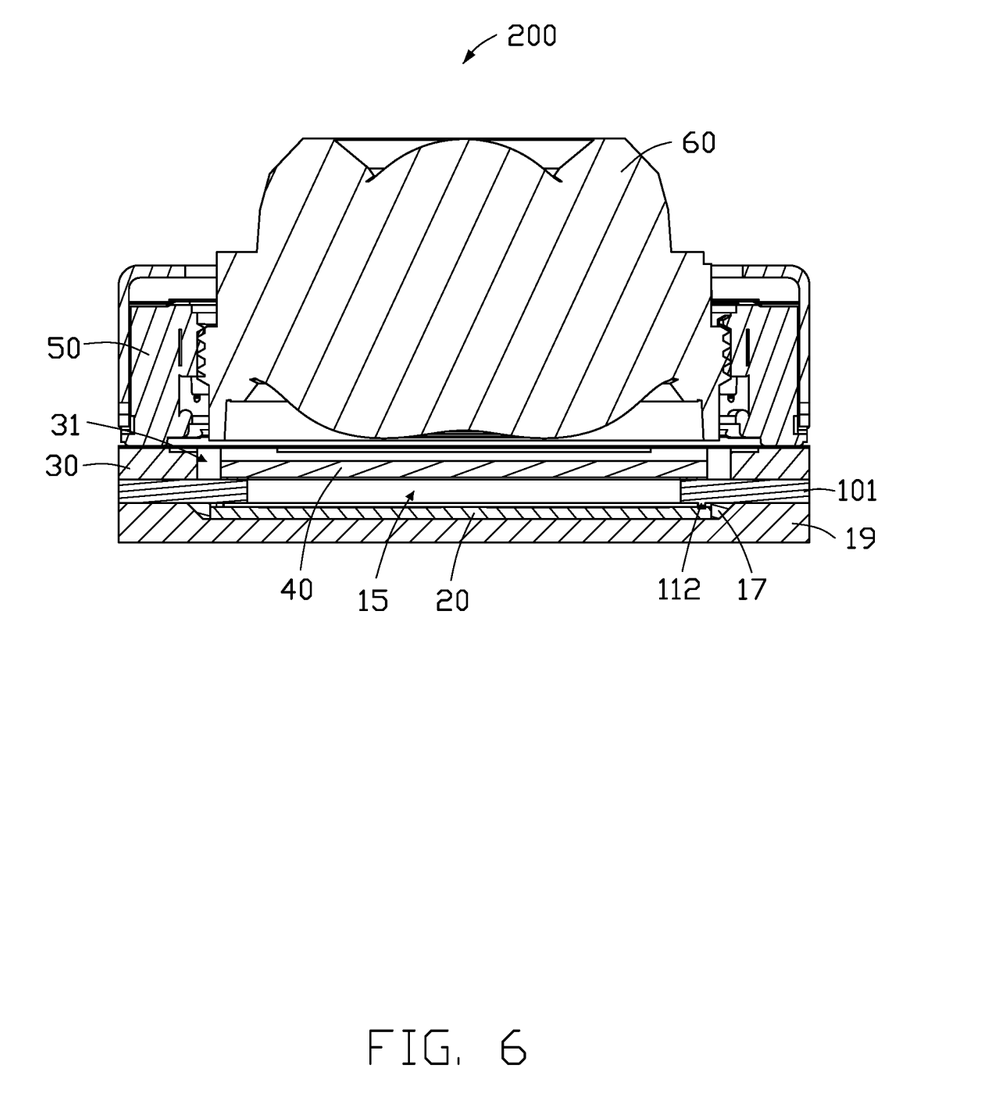
FIG. 6 is a cross-sectional view of a second embodiment of the lens module in FIG. 2 taken along line V-V.

FIG. 6 illustrates a second embodiment of a lens module 200. A difference between the lens module 200 and the lens module 100 is that the filter 40 is adhered to the second surface 13 of the circuit board 10.

In operation, the filter 40 filters out infrared light from light emitted onto a surface of the lens 60. The photosensitive chip 20 receives the filtered light and converts light signals of the filtered light into electric signals. The electric signals are output through the electrical coupling portion 21 to the circuit board 10, and the circuit board 10 processes the electric signals.

Because the electronic components 111 and the gold fingers 112 are installed on the first surface 11 of the circuit board 10 and the photosensitive chip 20 is installed on the first surface 11, a height of the lens module 100 is reduced. The mounting frame 30 installed on the second surface 13 of the circuit board 10 decreases a width of the lens module 100. Because a width of the mounting frame 30 is decreased, a width of the filter 40 is decreased. Because the injection molding layer 19 seals the photosensitive chip 20, the electronic components 111, and the gold fingers 112 therein, the electronic components 111 do not have direct contact with air outside of the camera module 100 and thus are not at risk of being contaminated by dust or water. Thus, a total size of the lens module 100 is reduced to satisfy market demand for miniaturization of electronic devices.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:
1. A method of assembling a lens module, the method comprising:
   providing a circuit board and a photosensitive chip, wherein:
      the circuit board comprises a first surface, an opposite second surface, a first hard portion, a second hard portion, and a soft portion, the soft portion located between the first hard portion and the second hard portion;

the circuit board defines a first through hole and the photosensitive chip is installed on the first surface aligned with the first through hole;
the first surface comprises a plurality of electronic components and gold fingers installed thereon, the electronic components and the gold fingers being located on the first hard portion on the first surface of the circuit board; and
one side of the photosensitive chip comprises an electrical coupling portion on an edge thereof, the electrical coupling portion electrically coupled to the gold fingers;
fixing the photosensitive chip onto the circuit board;
molding an injection molding layer on the first surface of the circuit board having the electronic components to integrally form the injection molding layer on the circuit board, the injection molding layer sealing the electronic components and the photosensitive chip within the injection molding layer;
providing a mounting frame and fixing the mounting frame onto the second surface of the circuit board, the mounting frame arranged on a side of the circuit board opposite to the photosensitive chip;
providing a filter and fixing the filter onto the mounting frame or onto the second surface of the circuit board, the filter arranged on a side of the circuit board opposite to the photosensitive chip;
providing a lens and a lens holder and installing the lens within the lens holder; and
fixing the lens holder onto a surface of the mounting frame facing away from the circuit board, the lens arranged on a side of the circuit board opposite to the photosensitive chip.

2. The method of claim 1, wherein when the photosensitive chip is being fixed onto the circuit board, a hollow first adhesive layer is arranged around a periphery of the photosensitive chip to fix the photosensitive chip to the circuit board, the hollow first adhesive layer sealing the gold fingers and the electronic components.

3. The method of claim 1, wherein:
the mounting frame defines a second through hole and a flange protruding from an inner wall of the second through hole toward a center of the second through hole;
the filter is fixed onto the flange, and the filter is coplanar with a surface of the mounting frame.

4. The method of claim 1, wherein a material of the injection molding layer is selected from at least one of nylon, liquid crystal polymer, and polypropylene.

5. A lens module comprising:
a photosensitive chip;
a hollow mounting frame;
a filter;
a lens holder;
a lens; and
a circuit board defining a first through hole and comprising a first surface, an opposite second surface, a first hard portion, a second hard portion, and a soft portion, the soft portion located between the first hard portion and the second hard portion; wherein:
the photosensitive chip is installed on the first surface facing the first through hole;
the first surface comprises a plurality of electronic components and gold fingers installed thereon, the electronic components and the gold fingers are located on the first hard portion on the first surface of the circuit board; and
one side of the photosensitive chip comprises an electrical coupling portion on an edge thereof, the electrical coupling portion electrically coupled to the gold fingers;
the circuit board further comprises an injection molding layer integrally formed onto the first surface;
the injection molding layer seals the electronic components and the photosensitive chip within the injection molding layer;
the mounting frame is fixed onto the second surface of the circuit board;
the filter is fixed onto the mounting frame or onto the second surface of the circuit board and is arranged on a side of the circuit board opposite to the photosensitive chip;
the lens is installed within the lens holder;
the lens holder is fixed onto a surface of the mounting frame facing away from the circuit board; and
the lens is arranged on a side of the circuit board opposite to the photosensitive chip.

6. The lens module of claim 5, wherein a hollow first adhesive layer is arranged around a periphery of the photosensitive chip to fix the photosensitive chip to the circuit board, the hollow first adhesive layer sealing the gold fingers and the electronic components.

7. The lens module of claim 5, wherein
the mounting frame defines a second through hole and comprises a flange protruding from an inner wall of the second through hole toward a center of the second through hole;
the filter is fixed onto the flange, and the filter is coplanar with a surface of the mounting frame.

8. The lens module of claim 5, wherein a material of the injection molding layer is selected from at least one of nylon, liquid crystal polymer, and polypropylene.

9. A lens module comprising:
a photosensitive chip;
a hollow mounting frame;
a filter;
a lens holder;
a lens; and
a circuit board comprising an injection molding layer, a first hard portion, a second hard portion, and a soft portion, the soft portion located between the first hard portion and the second hard portion; wherein:
the photosensitive chip is installed on a first surface of the circuit board;
the first surface comprises a plurality of electronic components and gold fingers installed thereon, the electronic components and the gold fingers are located on the first hard portion of the circuit board;
one side of the photosensitive chip comprises an electrical coupling portion electrically coupled to the gold fingers; and
the injection molding layer seals the photosensitive chip, the electronic components, and the gold fingers within the injection molding layer.

10. The lens module of claim 9, wherein:
the mounting frame is fixed onto a second surface of the circuit board opposite the first surface; and
the lens holder is fixed onto a surface of the mounting frame facing away from the circuit board.

11. The lens module of claim 10, wherein the filter is fixed onto the mounting frame.

12. The lens module of claim 10, wherein the filter is fixed onto the second surface of the circuit board.

13. The lens module of claim 12, wherein the electronic components and the gold fingers are located on the first surface of the circuit board.

14. The lens module of claim 12, wherein a hollow first adhesive layer is arranged around a periphery of the photosensitive chip to fix the photosensitive chip to the circuit board, the hollow first adhesive layer sealing the gold fingers and the electronic components.

15. The lens module of claim 14, wherein the filter is adhered by a second adhesive layer to a surface of the mounting frame facing away from the circuit board.

16. The lens module of claim 15, wherein a third adhesive layer is applied around a periphery of the lens holder to adhere the lens holder to a surface of the mounting frame facing away from the circuit board.

17. The lens module of claim 16, wherein a material of the hollow first adhesive layer, the second adhesive layer, and the third adhesive layer is optical cement.

* * * * *